April 1, 1952 — W. A. HENGGELER — 2,591,431
HYDRAULIC HAYFORK
Filed Feb. 11, 1949 — 2 SHEETS—SHEET 1

INVENTOR.
W. A. HENGGELER.
BY Arthur H. Sturges
Attorney.

April 1, 1952 W. A. HENGGELER 2,591,431
HYDRAULIC HAYFORK
Filed Feb. 11, 1949 2 SHEETS—SHEET 2

INVENTOR.
W. A. HENGGELER.
BY Arthur H. Sturges
Attorney

Patented Apr. 1, 1952

2,591,431

UNITED STATES PATENT OFFICE 2,591,431

HYDRAULIC HAYFORK

Wilfred A. Henggeler, Columbus, Nebr.

Application February 11, 1949, Serial No. 75,940

3 Claims. (Cl. 294—88)

This invention relates to hay forks and more particularly to a hay fork adapted for the loading and unloading of hay and similar products in a more economical and facile manner than heretofore.

A primary object of this invention resides in the provision of an improved hay fork particularly adapted to be hydraulically operated.

Another object of the invention is in the provision of an improved hay fork which may be advantageously used for stacking hay, for loading hay racks, for filling feed racks, for hauling hay from the stack, or placing it into the hay rack from the stack, or moving loads of hay, feed or the like from place to place.

A further object of the invention resides in the provision of a hay fork which automatically returns to an open position at times when hydraulic pressure is not being applied thereto.

Yet a further object of the invention is to provide a hay fork which is quick and powerful in its operation.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
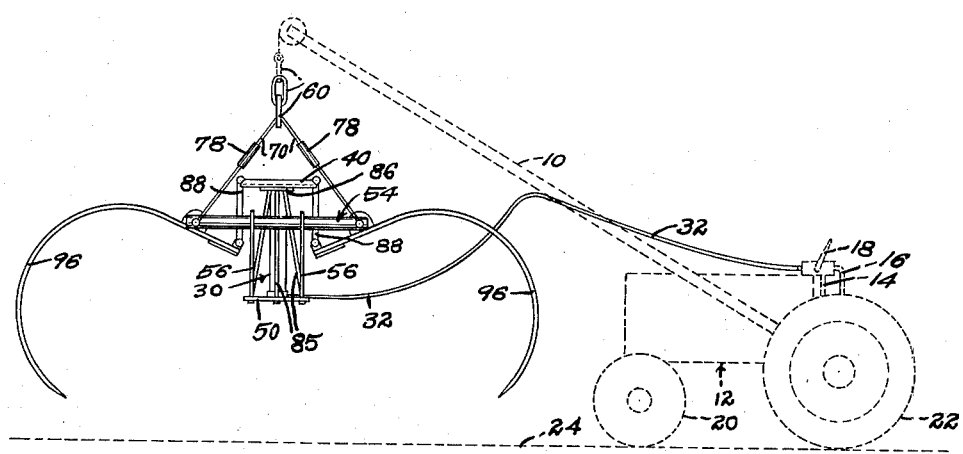
Figure 1 is a side elevation of the hay fork of this invention shown as attached to a tractor, the latter and the ground surface being shown in dotted lines.

The hay fork of this invention is for attachment, among other uses, to the boom or booms 10 of a tractor, generally indicated at 12 and shown in Figure 1 in dotted lines.

The tractor 12 is preferably one of the type having a hydraulic pump attached thereto, a pump outlet line 14 and a pump return line 16, together with a control valve 18, as best seen in Figure 1. The tractor 12 is, of course, further provided with wheels 20 and 22 for traveling across the surface of the ground 24.

Figure 4:
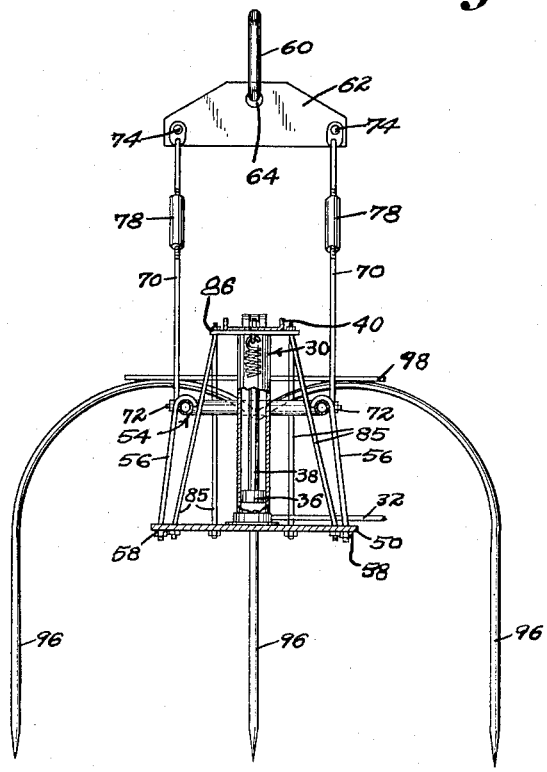
Figure 4 is a view-in-section taken along the line 4—4 of Figure 3, a portion of the hydraulic jack cylinder being broken away for showing the interior thereof, a lower portion of one of the springs also being broken away.

The form of this invention includes an hydraulic cylinder, generally indicated at 30, having a compressed oil line 32 extending therefrom to the lines 14 and 16 of the tractor. The cylinder 30 is provided with a piston 36 therein and rod 38, as best seen in Figure 4, the construction being such that at times when oil is flowing into the cylinder 30 through the line 32, the piston 36 will be moved upwardly and outwardly of the cylinder 30 for urging upwardly on a cross member 40, which latter is disposed at a right angle to the rod 38 and secured rigidly to the upper end thereof in any suitable manner.

The cylinder 30 is mounted upon a supporting base plate 50, which latter is suspended from a frame or yoke 54 in a horizontal position by means of supporting members or rods 56, which latter are rigidly secured to the yoke 54 and to the plate 50, the latter connection being made by nuts 58 or the like. The construction is such that the plate 50 is rigidly maintained spaced apart from and preferably in parallelism with the yoke 54.

The yoke 54 is itself composed of side and end members suitably secured together in a rectangular configuration. The yoke 54 is supported or suspended downwardly from the boom 10 of the tractor 12 by means of suitable linkage members 60 shown in Figures 1 and 2, and another linkage member 62, the latter being elongated and being supported downwardly from the lowermost one of the linkages 60 by means of an aperture 64 in the linkage 62 through which the lowermost link 60 is secured.

Suitable supporting rods 70 are secured to the outer ends of the member 62 and extend downwardly to the yoke 54, being secured to the latter by means of suitable bolts 72, the upper and lower ends of the rods 70 being provided with flat portions for receiving the bolts 72 and upper bolts 74. The rods 70 are each preferably provided with a turnbuckle 78 therein for regulating the length thereof.

The cross member or bar 40 is preferably provided with two coiled tension springs 80 secured to the under side thereof by means of suitable hooks 82, and the springs 80 extend downwardly to the plate 50 and are secured thereto by means of suitable hooks 84.

Brace rods 85 are provided secured to the plate 50 and a fitting 86, the latter being rigidly secured to the upper end of the cylinder 30.

Figure 3:
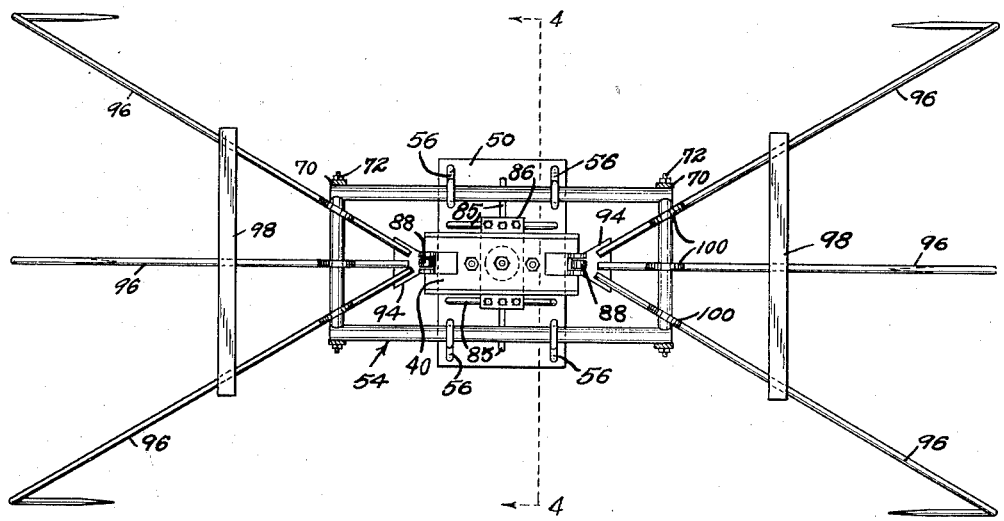
Figure 3 is a top plan view of the hay fork of the invention shown in an open position.

On the outer ends of the cross member 40 two downwardly extending elongated toggle members 88 are pivotally secured by means of suitable connecting members 90, as best seen in Figure 3. The toggle members or links 88 extend downwardly to and are pivotally secured to end members 94 of the tines 96.

The tines 96 are disposed in two groups, each oppositely disposed with respect to the other. The tines 96 of one group are disposed with their lower ends curving inwardly in a conventional manner toward the tines 96 of the other group. Each group is preferably composed of three or more tines, the tines of a group being disposed widely spaced apart at their outer ends by spacing braces 98, which latter extend transversely thereacross and are rigidly secured to the tines 96 at a point spaced apart from the convergent ends thereof.

The convergent ends of the tines of a group are together rigidly secured to the member 94 of that group and the said convergent ends are disposed closely spaced apart from or abutting each other.

Each tine 96 is preferably provided with a vertically disposed upwardly extending ear 100, which latter are each provided with an aperture for pivotally receiving one side of the yoke 54, which latter is of an elongated shape and round in cross section.

Figure 2:
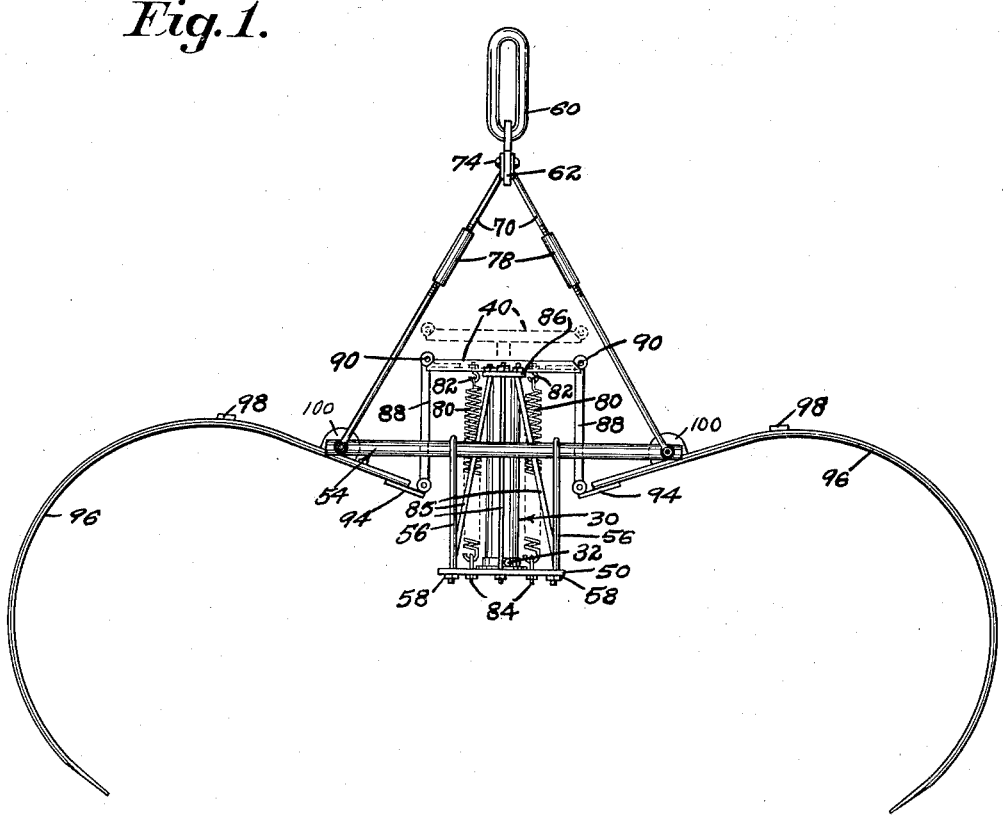
Figure 2 is a detailed side elevation of the fork shown with springs in operative position thereon, a portion of the springs being broken away, another position of certain parts thereof being shown in dotted lines for illustrating the movement made during closing of the fork.

As thus described, it will be seen that in operation at times when oil under pressure is caused to enter the cylinder 30 through the line 32, by manipulation of the lever 18, the piston 38 will move upwardly causing the cross member 40, toggle members 88, and the inner ends of the tines 96 to move upwardly, the tines 96 pivoting on the ears 100 about the yoke 54, as best seen in Figure 2.

As thus described, the oppositely disposed groups 96 will close or converge toward each other for grasping hay or the like.

When the oil pressure is released, the springs 80 will cause the cross member 40 to return to a downward position, forcing downwardly the inner ends of the tines 96 for opening the fork.

This invention has provided an efficient automatically opening fork, for the handling of hay or the like, which is adapted to operate using the hydraulic power of the tractor.

From the foregoing description it is thought to be obvious that a hydraulic hay fork constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as claimed.

I claim:

1. In a hay gripping fork, the combination which comprises a horizontally disposed rectangular-shaped frame having side and end members, a transversely disposed horizontally positioned base plate positioned below the intermediate part of the frame, rods suspending the said base plate from the frame, a vertically disposed cylinder mounted on said base plate and extended upwardly through said frame, said cylinder having a piston therein and having a piston rod extended from the upper end thereof, a cross bar carried by the upper end of said piston rod, outwardly diverging tines having downwardly disposed arcuate hay gripping ends pivotally mounted on the end members of the said frame, links connecting the inner ends of the tines to extended ends of the said cross bar whereby upward travel of the cross bar by the piston in the cylinder forces the lower arcuate ends of the tines inwardly, upwardly converging supporting rods extended from the ends of the end members of the frame, and a link connecting and extended from the upper ends of the said supporting rods.

2. In a hay gripping fork, the combination which comprises a horizontally disposed rectangular-shaped frame having side and end members, a transversely disposed horizontally positioned base plate located below the intermediate part of the frame, rods suspending the base plate from side members of the frame, a vertically disposed cylinder mounted on said base plate and extended upwardly through said frame, said cylinder having a piston therein and having a piston rod extended from the upper end thereof, a cross bar carried by the upper end of the piston rod, outwardly diverging tines having downwardly disposed arcuate hay gripping ends pivotally mounted on the end members of the frame, links connecting inner ends of the tines to extended ends of the said cross bar whereby upward travel of the cross bar by the piston in the cylinder forces the arcuate lower ends of the tines inwardly, springs extended from the said cross bar and positioned to coact with the cylinder for actuating the tines, upwardly converging supporting rods extended from the end members of the frame and a link connecting the upper ends of the said supporting rods.

3. In a hay gripping fork, the combination which comprises a horizontally disposed rectangular-shaped frame having side and end members, a transversely disposed horizontally positioned base plate located below the intermediate part of the frame, rods suspending the base plate from side members of the frame, a vertically disposed cylinder mounted on said base plate and extended upwardly through said frame, said cylinder having a piston therein and having a piston rod extended from the upper end thereof, a cross bar carried by the upper end of the piston rod, springs connecting the cross bar to the said base plate, outwardly diverging tines having downwardly disposed arcuate hay gripping lower ends pivotally mounted on the end members of the said frame, links connecting inner ends of the tines to extended ends of the said cross bar whereby upward travel of the cross bar by the cylinder forces the lower ends of the tines inwardly, upwardly converging supporting rods having turnbuckles therein extended from the end members of the said horizontally disposed frame, and an open link connecting the upper ends of the said supporting rods.

WILFRED A. HENGGELER.

REFERENCES CITED

The following references are of record in the file of this patent:

UNITED STATES PATENTS

| Number | Name | Date |
|---|---|---|
| 1,328,487 | Billings | Jan. 20, 1920 |
| 2,049,679 | Whiteman et al. | Aug. 4, 1936 |
| 2,474,374 | Shattuck | June 28, 1949 |